United States Patent [19]
Uno et al.

[11] Patent Number: 5,642,626
[45] Date of Patent: Jul. 1, 1997

[54] CONTROL CIRCUIT FOR A VEHICLE AIR CONDITIONING SYSTEM

[75] Inventors: Hideki Uno, Toyota; Yoshizo Ito, Nagoya; Yoshiyuki Muramatsu, Anjo, all of Japan

[73] Assignee: Kojima Press Industry Co., Ltd., Aichi, Japan

[21] Appl. No.: 622,999

[22] Filed: Mar. 28, 1996

[30] Foreign Application Priority Data

Apr. 4, 1995 [JP] Japan .................. 7-104761

[51] Int. Cl.$^6$ .................................................. B60H 1/32
[52] U.S. Cl. .................................................. 62/127; 165/204
[58] Field of Search .......................... 62/127, 126, 125, 62/244; 165/11.1, 204; 236/94

[56] References Cited

U.S. PATENT DOCUMENTS

| | | | |
|---|---|---|---|
| 4,762,169 | 8/1988 | Andersen et al. | 165/204 X |
| 4,791,981 | 12/1988 | Ito | 165/204 |
| 4,827,730 | 5/1989 | Doi et al. | 62/127 |
| 5,152,335 | 10/1992 | Doi et al. | 165/204 |
| 5,220,805 | 6/1993 | Fukudomi | 62/126 |
| 5,230,467 | 7/1993 | Kubsch et al. | 62/127 X |

FOREIGN PATENT DOCUMENTS

| | | |
|---|---|---|
| 61-75011 | 4/1986 | Japan . |
| 63-22724 | 1/1988 | Japan . |
| B2-2-60535 | 12/1990 | Japan . |

*Primary Examiner*—Harry B. Tanner
*Attorney, Agent, or Firm*—Oliff & Berridge

[57] ABSTRACT

The invention is directed to a control circuit for a vehicle air conditioning system which includes a compressor and a plurality of vents. A plurality of mode switches are provided for shifting the vents in accordance with a plurality of control modes including a defroster mode. When one of the mode switches is turned on, the rest of them are turned off. Each mode switch has a first switching section and a second switching section. A third switching section is formed by contacts which are provided at the "off" side of one of the first and second switching sections in the rest of the mode switches, and which are connected in series. With the first, second and third switching sections operated, are connected or disconnected a defroster circuit, a compressor circuit, a first indicator circuit for indicating a condition of the compressor being activated, and a second indicator circuit for indicating a defroster mode. For example, the first switching section is provided for connecting or disconnecting the first indicator circuit and the second indicator circuit. The second switching section is provided for connecting or disconnecting the compressor circuit. And, the third switching section is provided for connecting or disconnecting the defroster circuit.

15 Claims, 16 Drawing Sheets

FIG. 15

| EMB. | CONTACTS | | TERMINALS OF AMPLIFIER | | | | | |
|---|---|---|---|---|---|---|---|---|
| | | | D E F | A/C+ | A/C | A C I D | I G | G N D |
| 1 | D E F | A c | | | | | LA | LD |
| | | B c | | ○—○ | | | | |
| | | C o | ○————————————————○ | | | | | |
| 2 | D E F | A c | ○————————————————○ | | | | LD | |
| | | B c | | ○—○ | | | | |
| | | E o | | | | LA | | |
| 3 | D E F | A c | | | | LA | | |
| | | B c | | ○—○ | | | | |
| | | C o | ○————————————————○ | | | | LD | |
| 4 | D E F | A c | ○————————————————○ | | | | LD | |
| | | B c | | | | LA | | |
| | | E o | | ○—○ | | | | |
| 5 | D E F | A c | | | | LA | | |
| | | B c | | ○—○ | | | | |
| | | C o E o | ○————————————————○ | | | | LD | |

FIG. 16

| EMB. | CONTACTS | | TERMINALS OF AMPLIFIER | | | | |
|---|---|---|---|---|---|---|---|
| | | | DEF | A/C | ACID | IG | GND |
| 6 | DEF | Ac | o————————————————o | | | o—(LD)—o | |
| | | | | | | o————o | |
| | | Bc | | | o—(LA)—o | | |
| | | Co | | o————————————o | | | |
| 7 | DEF | Ac | o————————————————————o | | | | |
| | | Bc | | | o—(LA)—o | | |
| | | Co | | | | o—(LD)—o | |
| | | | | | | o————o | |
| 8 | DEF | Ac | | | | o————o | |
| | | | o————————————————o | | | | |
| | | Bc | | | o—(LA)—o | | |
| | | Co | | | | o—(LD)—o | |
| 9 | DEF | Ac | | | o—(LA)—o | | |
| | | Bc | | | | o—(LD)—o | |
| | | Co | | o————————————o | | | |
| | | | o————————————————o | | | | |
| 10 | DEF | Ac | | | o—(LA)—o | | |
| | | Bc | | | | o—(LD)—o | |
| | | | | o————————————o | | | |
| | | Co | o————————————————————o | | | | |
| 11 | DEF | Ac | o————————————————o | | | | |
| | | Bc | | | | o—(LD)—o | |
| | | | | o————————————o | | | |
| | | Eo | | | o—(LA)—o | | |
| 12 | DEF | Ac | | o————————————o | | | |
| | | | o————————————————————o | | | | |
| | | Bc | | | | o—(LD)—o | |
| | | Eo | | | o—(LA)—o | | |

CONTROL CIRCUIT FOR A VEHICLE AIR CONDITIONING SYSTEM

BACKGROUND OF THE INVENTION

1. Field of the Invention

The present invention relates to a control circuit for an air conditioning system of a vehicle, and more particularly to the control circuit for shifting a control mode to a "defroster" mode, activating a compressor of the air conditioning system and indicating its mode, when the "defroster" mode is selected to defrost a front windshield of the vehicle.

2. Description of the Related Arts

A recent model of an air conditioning system for use in a vehicle is provided with all the functions of cooling, heating, dehumidification and ventilation, so that any one of various control modes can be selected by passengers in the vehicle at their own discretion, and also the control mode can be selected automatically in response to temperature in a passenger compartment, or the like. In Japanese Patent Laid-open Publication No.61-75011, it is proposed to ensure a defrosting function when a "heat/defroster" mode is selected in such a condition of relatively high humidity that the windshield is likely to be fogged, as in a raining condition in a cold weather. For this purpose, it is proposed to change an ohmic value of a temperature control resistor in accordance with the selected control mode so as to provide a cooling condition under a minimum temperature, and provide a dehumidification effect by an evaporator as well as defogging effect by air flow. Therefore, a mode detection switch is provided for setting the ohmic value for the temperature control resistor to enable a compressor to operate in the "heat/defroster" mode. Also, in Japanese Patent Laid-open Publication No.63-22724, there is disclosed a demist control apparatus for a vehicle air conditioning system, which is arranged to activate a compressor until a temperature of an evaporator is decreased lower than the freezing temperature thereof, when a "recirculation" mode is selected in a cold weather to cause windows to fog up.

According to the vehicle air conditioning systems as described above, when the "defroster mode" is selected, it is preferable to activate the cooling compressor, so as to blow the air dehumidified by the evaporator to the windshield. In this case, it is preferable that once a passenger simply operates a "defroster" mode switch, the control mode will be shifted to the "defroster" mode automatically, and the compressor will start to operate. Furthermore, it is preferable to indicate operating conditions of those devices, i.e., an indication of the "defroster" mode being selected and that of the compressor being activated (hereinafter, simply referred to as "A/C operating indication" to represent both indications).

With respect to a driving circuit of an actuator or the like for activating the compressor, there is known a control circuit for activating the actuator and indicating the activating condition. For example, Japanese Patent Publication for opposition No. 2-60535 discloses an apparatus which includes a plurality of driving lines connected to each actuator driving circuit, a plurality of indication lines provided in accordance with each driving line for indicating an operating condition of each actuator, and an apparatus for changing an operating condition including a plurality of switches provided in accordance with each driving line and indication line, and which controls the actuator driving circuit by operating each switch so as to control each actuator driving circuit, and indicates the operating condition of the actuator by controlling the respective indication line. In the apparatus as described in the publication, a plurality of switches are provided to constitute the apparatus for changing the operating condition, wherein each switch is formed by a pair of switching sections for switching two terminals respectively, and wherein one terminal of each switching section is connected to the respective driving line or indication line to separate electrically from each other, and an output terminal of each switching section is connected to the other terminal of a pair of switching sections for constituting the switch at next stage, one after another, and finally grounded to the earth.

FIG. 14 illustrates a control circuit which enables the control mode of the vehicle air conditioning system to be shifted to the "defroster" mode by turning a "defroster" mode switch on, and which enables its operating condition to be indicated by the indicator, at the same time. The circuit as shown in FIG. 14 relates to a so-called heater control device, in which a group of terminals to be connected with amplifiers in the air conditioning system are indicated by alphabetical indications encircled and indicated by "AMP" in FIG. 14. The heater control device is a device for shifting an inlet and outlet of the air conditioning system, shifting vents thereof, changing an amount of air flow, controlling a temperature of the air, and so on. According to a recent heater control device, when switches are operated to output electric signals, servomotors installed in the air conditioning system are activated in response to the output signals. The terminals as shown in FIG. 14 are described in detail hereinafter.

First of all, "ILL+" and "ILL−" are terminals connected to a circuit for lightening night illumination lamps (LMP) which are mounted on a heater control panel, or an air conditioner control panel. An on-off switch for closing or opening the circuit is provided as an illumination switch (not shown) in the compartment of the vehicle. Next, a terminal (FACE) is provided for fixing an air outlet to a "Face" mode in which the air flow is directed to a passenger's face. A terminal (B/L) is provided for fixing the air outlet to a "bi-level" mode in which the air is blown into the compartment through an outlet for blowing the air near the passenger's face, and at the same time through an outlet for blowing the air near the passenger's feet. A terminal (FOOT) is provided for fixing the air outlet to a "foot" mode in which the air flow is directed to the passenger's feet. A terminal (F/D) is provided for fixing the air outlet to a "foot/defroster" mode in which the air is blown into the compartment through the outlet for blowing the air near the passenger's feet, and also through the outlet for blowing the air to the inner surface of the front windshield. With each of those terminals (FACE), (B/L), (FOOT) and (F/D) grounded to the earth, a driving signal is fed to each amplifier (not shown).

A terminal (DEF) is provided for fixing the air outlet to a "defroster" mode in which the air flow is directed to the inner surface of the front windshield. When the terminal (DEF) is grounded, a driving signal is fed to an amplifier (not shown). Terminals (A/C+) and (A/C) are provided for activating a compressor of the air conditioning system, and so arranged that when the terminals are electrically connected with each other, a signal for activating the compressor is fed to an amplifier (not shown) of the compressor. This is because it is necessary to prevent the compressor from being activated, when a blower fun motor (not shown) is in "off" condition. Therefore, there may be a case where the compressor will not be activated, even if an air conditioning switch (hereinafter, referred to as A/C mode switch) (6) is turned on. It may be so constructed that the terminal (A/C) is grounded to provide a signal for activating the compressor. A terminal (ACID) is provided for being grounded only when the compressor operates, because the compressor may not be activated even if the A/C mode switch (6) is turned off, as described above. Accordingly, an indicator (LA) will not be lightened unless the compressor operates, even when the A/C mode switch (6) is in "on" condition. The terminal (ACID) may be omitted by grounding it to the earth. A terminal (REC) is provided for fixing the air inlet to a "recirculation" mode in which the air is recirculated in the compartment, while a terminal (FRS) is provided for fixing the air inlet to a "fresh air" mode in which the air is introduced from outside of the compartment. When these terminals (REC), (FRS) are grounded, the signal for activating the corresponding amplifier is fed. A terminal (IG) is connected to a battery (not shown) through a switch co-operating with an ignition switch (not shown), so that when the ignition switch is in "off" condition, the circuit as shown in FIG. 14 is not supplied with the electric power. The terminal (GND) is connected to an earth terminal of the battery (not shown).

A light control circuit (DCT) is connected to the terminal (IG), and includes the indicators (LA), (LD) formed by light emitting diodes (i.e., LED), brightness of which is slightly reduced at night. That is, when the night illumination lamp (LMP) is in "off" condition, a transistor (Trx) which is connected to the terminal (IG) through a diode (Dx) is turned on, so that a relatively high voltage is applied to each of series circuits having the respective indicators (LA), (LD) to lighten them relatively bright. However, when the night illumination lamp (LMP) is in "on" condition, the transistor (Trx) is turned off, so that each of the series circuits having the respective indicators (LA), (LD) is connected to the battery through the diode (Dx), as well as a resistor (Rx) and a diode (Dy) which are connected between the emitter and collector of the transistor (Trx). Therefore, a current fed to each of the indicators (LA), (LD) is reduced to lighten them relatively dark, comparing with those lightened when the night illumination lamp (LMP) is off.

As shown in FIG. 14, a pair of switches are formed to be operated simultaneously, in each of a FACE mode switch (1), B/L mode switch (2), FOOT mode switch (3), F/D mode switch (4), DEF mode switch (5), A/C mode switch (6) and F/R mode switch (7). In each mode switch, a pair of switches are formed of a lock type. Among the mode switches, a self-lock mechanism is formed in the A/C mode switch (6) and F/R mode switch (7). The rest of the mode switches are mechanically connected with each other to form a lock-release mechanism, by which only one of the mode switches (including a pair of switches) is locked to be "on", while other mode switches are not locked. Therefore, in accordance with the normal operation of the mode switches, at least one of them is turned on. However, all the mode switches can be turned off. In such an abnormal case where a pair of mode switches are operated simultaneously, none of the switches can be locked without a particular mechanism to avoid it.

Thus, each mode switch has a pair of switches co-operating with each other (referred to as a first switching section and second switching section), each switch having a pair of fixed contacts and a moving contact for moving to contact with one or the other of the fixed contacts. When each switch is off, the circuit is open, and when each switch is on, the circuit is closed. For example, in the DEF mode switch (5), a fixed contact (Ac) is provided for closing a circuit in switching operation, in other words a fixed contact at "on" side of the first switching section is indicated by (Ac). And, a fixed contact at "off" side of the first switching section is indicated by (Ao). With respect to the second switching section, the fixed contact at "on" side is indicated by (Bc), and the fixed contact at "off" side is indicated by (Bo). Moving contacts for use in the switches are indicated by (Am), (Bm), respectively, as shown in FIG. 14.

In operation, when the DEF mode switch (5) is turned on, the moving contacts (Am), (Bm) of the switches are connected to the fixed contacts (Ac), (Bc) at the "on" side as shown in FIG. 14. As a result, the terminal (DEF) is connected to the terminal (GND) through the fixed contact (Ac), and also transistors (Tr1), (Tr2) are activated to allow a current flow as indicated by an arrow respectively in FIG. 14, so that the terminal (A/C+) is electrically connected to the terminal (A/C) through the transistor (Tr1), and the light control circuit (DCT) is electrically connected to the terminal (ACID) through the transistor (Tr2) and indicator (LA). At the same time, the light control circuit (DCT) is electrically connected to the terminal (GND) through the indicator (LD) and the fixed contact (Bc). Consequently, a drive circuit for actuating the defroster (not shown) is operated, and a drive circuit for actuating the compressor (not shown) is operated, with the indicators (LD), (LA) operated to indicate their operating conditions, respectively.

That is, the aforementioned functions can be performed with the mode switches and terminals provided in the same conditions as in the prior apparatus. However, a pair of switching transistors are needed in the above-described construction, and resistors or the like are needed as well, so that the cost of the apparatus will be raised.

SUMMARY OF THE INVENTION

Accordingly, it is an object of the present invention to provide a control circuit for a vehicle air conditioning system, wherein by simply operating a defroster mode switch, the defroster mode is selected, a compressor is activated, and the defroster mode and the condition of the compressor are indicated automatically.

In accomplishing the above and other objects, a control circuit for a vehicle air conditioning system which has a compressor for dehumidifying air and a plurality of vents disposed in the vehicle for controlling the air dehumidified by the compressor and introduced into a compartment of the vehicle, comprises a compressor circuit for activating the compressor, a defroster circuit for shifting an air outlet to a vent for removing fog from windows of the vehicle, a first indicator circuit for indicating a condition of the compressor being activated, a second indicator circuit for indicating a defroster mode, and a plurality of mode switches for shifting the vents in accordance with a plurality of control modes including the defroster mode. Each of the mode switches has a first switching section and a second switching section which are actuated together in response to operation of each of the mode switches. The mode switches is arranged such that when one of the mode switches is turned on, the rest of the mode switches are turned off. The control circuit further comprises a third switching section which includes contacts provided at each "off" side of one of the first switching section and second switching section provided in the rest of the mode switches, and which are connected in series. The first, second and third switching sections are provided for connecting or disconnecting the defroster circuit, compressor circuit, first indicator circuit and second indicator circuit.

In the control circuit, it is preferable that two of the first, second and third switching sections are provided for connecting or disconnecting the defroster circuit and connecting or disconnecting the compressor circuit, respectively, the remaining one of the first, second and third switching sections is provided for connecting or disconnecting the first indicator circuit, and one of said first, second, third switching sections is provided for connecting or disconnecting the second indicator circuit.

The control circuit may be constituted such that two of the first, second and third switching sections are provided for connecting or disconnecting the first indicator circuit and connecting or disconnecting the second indicator circuit, respectively, and the remaining one of the first, second and third switching sections is provided for connecting or disconnecting the defroster circuit and the compressor circuit.

BRIEF DESCRIPTION OF THE DRAWINGS

The above stated objects and following description will become readily apparent with reference to the accompanying drawings, wherein like reference numerals denote like elements, and in which:

FIG. 15 is a diagram showing connections between switches and terminals according to the first to fifth embodiments of the present invention; and FIG. 16 is a diagram showing connections between switches and terminals according to the sixth to twelfth embodiments of the present invention.

DESCRIPTION OF THE PREFERRED EMBODIMENTS

Figure 14:
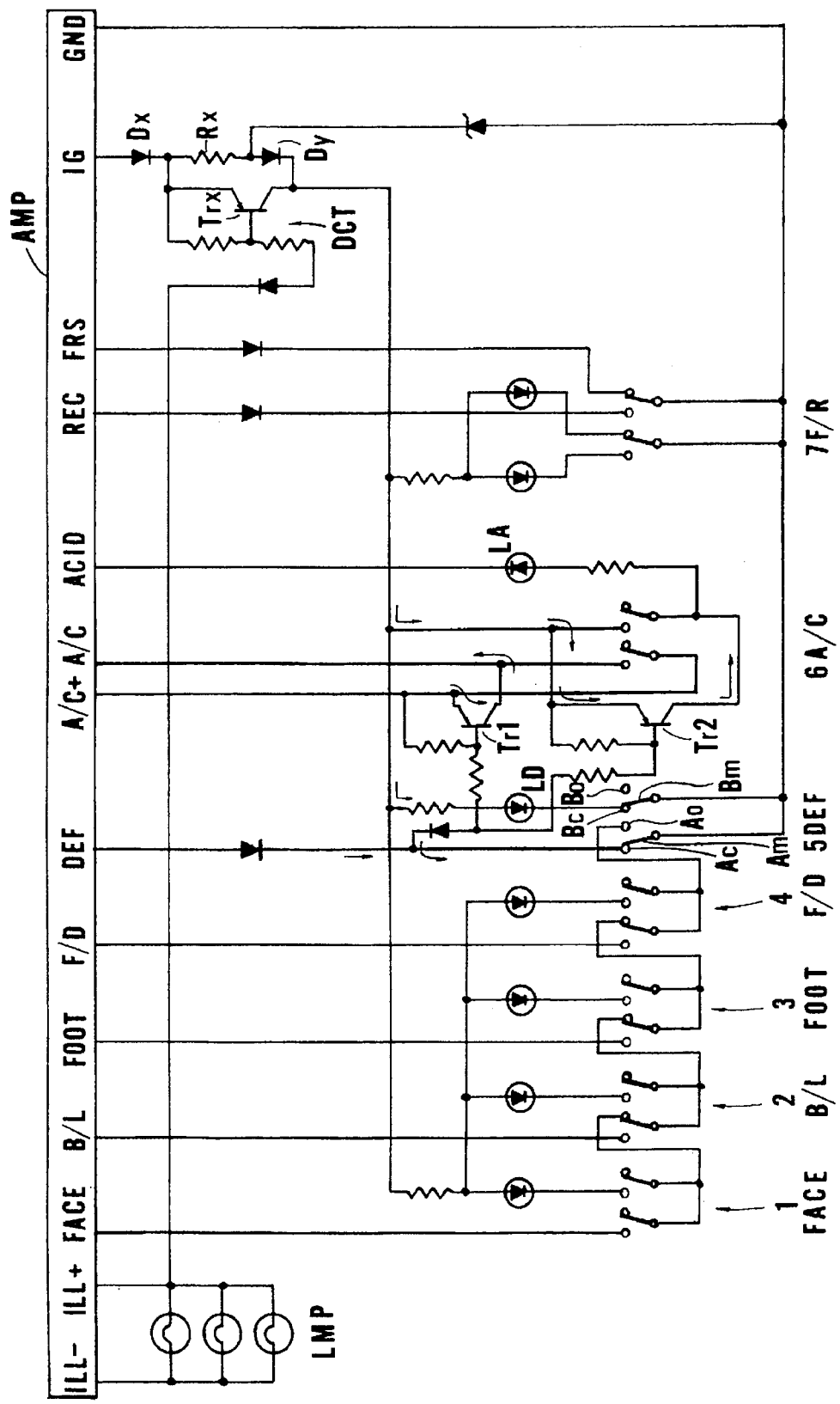
FIG. 14 is a schematic diagram showing an example of a control circuit to be compared with the embodiments as shown in the preceding drawings.

Referring to FIGS. 1–12, there are schematically illustrated control circuits for a vehicle air conditioning system according to the first to twelfth embodiments of the present invention. The first to fifth embodiments are provided with the same mode switches and terminals as those of the control circuit as shown in FIG. 14. That is, each mode switch has a pair of switch sections which are referred to as a first switching section and a second switching section, and served as the first and second switching means of the present invention. These first and second switching sections are arranged to cooperate with each other. Each of the first and second switching sections has a pair of fixed contacts and a moving contact which is arranged to move between the fixed contacts, and contact with either one of the fixed contacts. When the switch is off, therefore, the circuit is open, and when the switch is turned on, the circuit is closed. Also, when one of the mode switches is turned on, all of other mode switches are turned off. In FIGS. 1–12, with respect to the first switching section included in each of the FACE mode switch (1), B/L mode switch (2), FOOT mode switch (3) and F/D mode switch (4), a fixed contact which is provided at the "on" side of the first switching section is indicated by (Cc), and the other fixed contact at the "off" side of the first switching section is indicated by (Co), while the moving contact is indicated by (Cm). With respect to the second switching section, a fixed contact which is provided at the "on" side is indicated by (Ec), and the other fixed contact at the "off" side of the second switching section is indicated by (Eo), while the moving contact is indicated by (Em). According to the first to fifth embodiments, when the DEF mode switch (5) is turned on, a compressor (not shown) is activated. However, when a blower fan motor (not shown) is off, the compressor is not activated.

Figure 1:
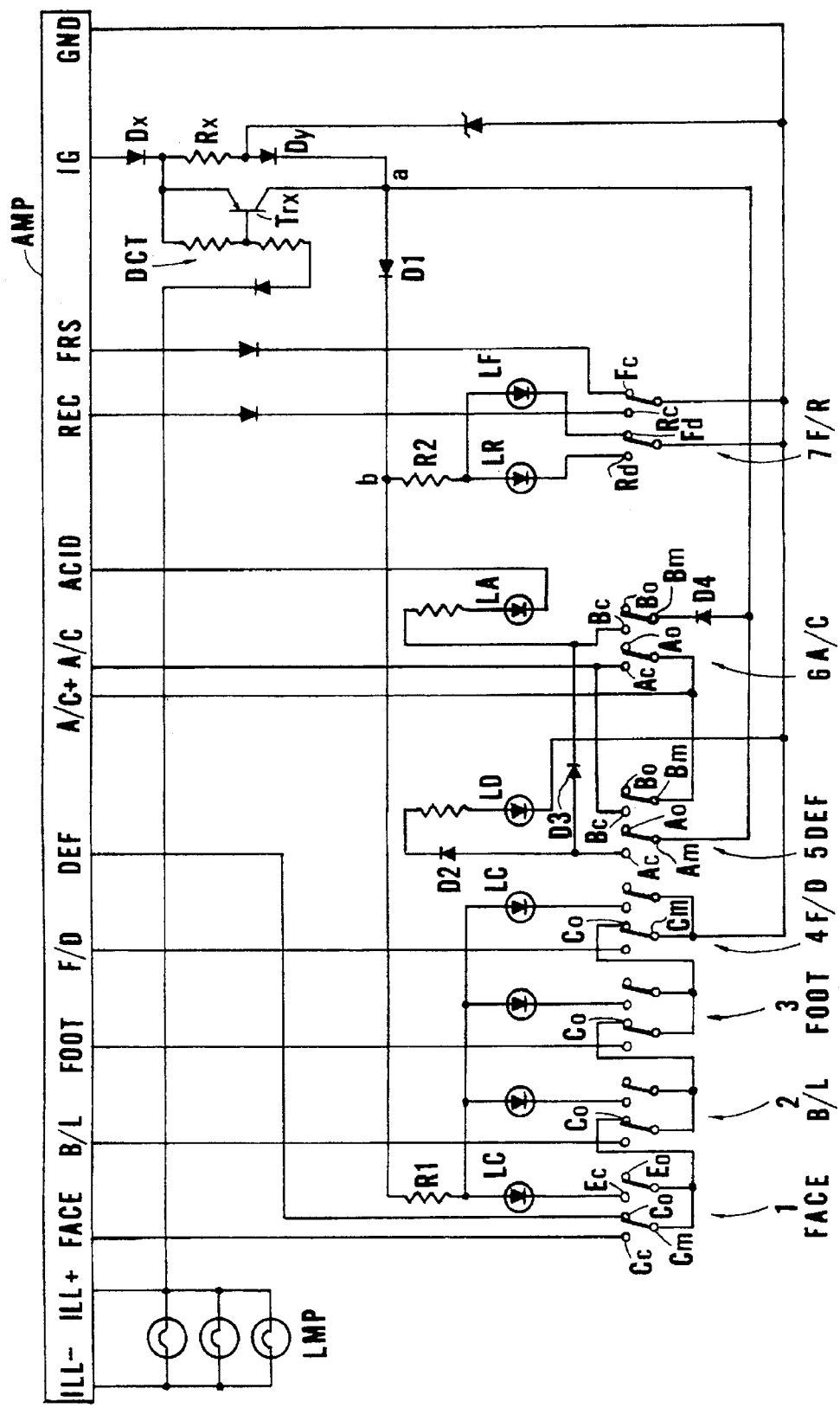
FIG. 1 is a schematic diagram showing a control circuit for a vehicle air conditioning system according to a first embodiment of the present invention.

Referring to FIG. 1, the first embodiment includes the FACE mode switch (1), B/L mode switch (2), FOOT mode switch (3) and F/D mode switch (4), each of which has a pair of switches. The fixed contacts (Co) provided at the "off" side of each first switching section in the FACE mode switch (1) and so on are connected in series through the moving contacts (Cm). And, the fixed contacts (Co) of the FACE mode switch (1) is connected to the terminal (DEF) of the amplifier, the moving contact (Cm) of the F/D mode switch (4), which is provided in the last block, is connected to the terminal (GND). The fixed contacts (Cc) provided at the "on" side of the first switching section are connected to the respective terminals (FACE and so on). When one of the mode switches is turned on, its moving contact (Cm) is connected to its fixed contact (Cc), so that one of the terminals (FACE and so on) is connected to the terminal (GND) to be grounded. In this case, the rest of the mode switches remain off. With respect to the second switching section in the FACE mode switch (1) and so on, the light control circuit (DCT) is connected to indicators which are represented by (LC) and made of light emitting diodes, each cathode of which is connected to the fixed contact (Ec) at the "on" side of the first switching section, while the fixed contact (Eo) at the "off" side is open. The moving contact (Em) of the second switching section is connected to the fixed contact (Co) of the first switching section of the next mode switch together with the moving contact (Cm) of the first switching section, and the moving contact (Cm) of the last F/D mode switch (4) is connected to the terminal (GND).

Figure 13:
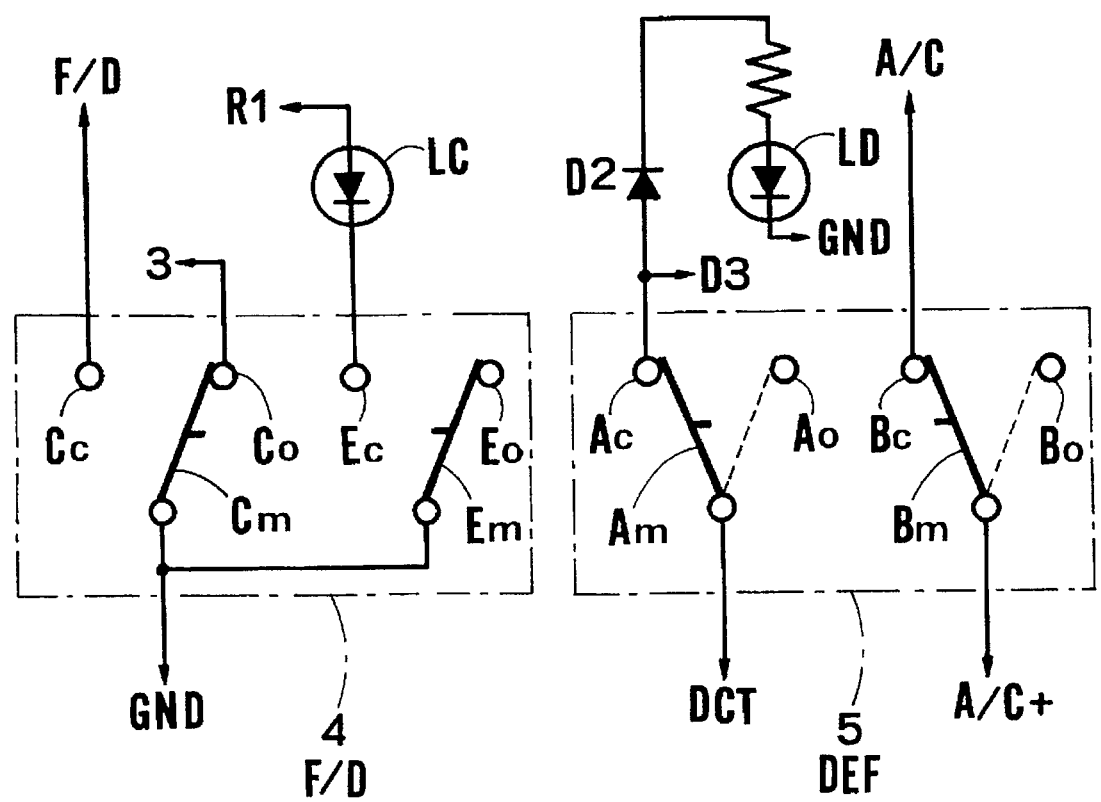
FIG. 13 is a circuit diagram showing a pair of switches in a mode switch according to the first embodiment of the present invention.

With respect to the DEF mode switch (5), the fixed contact (Ac) at the "on" side of the first switching section is connected to an anode of the indicator (LD) made of a light emitting diode, i.e., LED, whose cathode is connected to the terminal (GND). The fixed contact (Bc) at the "on" side of the second switching section in the DEF mode switch (5) is connected to the terminal (A/C), while the moving contact (Bm) is connected to the terminal (A/C+). Therefore, when the second switching section is operated so that the moving contact (Bm) is connected to the fixed contact (Bc), the terminals (A/C+) and (A/C) are electrically connected with each other to activate the compressor (not shown), so that the compressor will start to rotate if the blower fun motor (not shown) is on. The fixed contacts (Ao), (Bo) at the "off" sides are open contacts. Thus, a third switching section served as the third switching means according to the present invention is formed by contacts (Co) (or (Eo)) which are provided at the "off" side of the fixed contacts of the mode switches other than the DEF mode switch (5), and which are connected in series. The relationship of the contacts in this embodiment is shown in an enlarged circuit diagram of FIG. 13, in which the DEF mode switch (5) is turned on, from its "off" position as indicated by a phantom line.

With respect to the A/C mode switch (6), its first switching section is arranged in parallel with the second switching section of the DEF mode switch (5), and the fixed contact (Ac) is connected to the terminal (A/C). The fixed contact (Bc) of the second switching section of the A/C mode switch (6) is connected to an anode of the indicator (LA), whose cathode is connected to the terminal (ACID). The fixed contact (Bo) of the second switching section of the A/C mode switch (6) is an open contact, and the moving contact (Bm) is connected to the light control circuit (DCT) through a diode D4. Between the fixed contact (Ac) of the DEF mode switch (5) and the fixed contact (Bc) of the A/C mode switch (6), there is disposed a diode (D3) which is arranged to prevent a current from flowing from the fixed contact (Bc) of the A/C mode switch (6) to the fixed contact (Ac) of the DEF mode switch (5), i.e., to the indicator (LD), when the A/C mode switch (6) is turned on, while the DEF mode switch (5) is off. As to the F/R mode switch (7), a fixed contact (Rd) of its first switching section is connected to an indicator (LR), while a fixed contact (Fd) is connected to an indicator (LF). Both of the indicators LR, LF are connected at their anodes to the light control circuit (DCT) through a resistor (R2) and the diode (D1). A fixed contact (Rc) of the second switching section of the F/R mode switch (7) is connected to the terminal (REC), while a fixed contact (Fc) is connected to the terminal (FRS). Accordingly, in response to operation of the F/R mode switch (7), either of the terminals (REC) and (FRS) is connected to the light control circuit (DCT), and at the same time the indicator (LR) or (LF) is lightened.

In operation, when the DEF mode switch (5) is turned on according to the first embodiment, the first and second switching sections operate together, so that the moving contacts (Am), (Bm) are connected to the fixed contacts (Ac), (Bc), respectively. In this case, the FACE mode switch (1) and so on remain off, so that the moving contacts (Cm), (Em) are connected to the fixed contacts (Co), (Eo), respectively. As a result, the terminal (DEF) is connected to the terminal (GND) through the fixed contacts (Co) of the FACE mode switch (1) and so on which are connected in series with the terminal (DEF), thereby to actuate the driving circuit of the defroster (not shown). At the same time, the terminal (A/C+) is connected to the terminal (A/C) through the terminal (Bc) of the DEF mode switch (5), thereby to actuate the driving circuit of the compressor. The indicators (LD), (LA) are connected to the light control circuit (DCT) through the fixed contacts (Ac), (Bc) of the DEF mode switch (5), thereby to be lightened to indicate that the defroster mode or the air conditioning mode has been selected, respectively. Thus, by simply turning the DEF mode switch (5) on, the defroster mode is selected, and the compressor is activated, and also these operations are indicated.

According to the embodiment as shown in FIG. 1, each of the indicators (LA), (LD), (LC) is arranged to form a series circuit of three elements made of LED, resistor and diode (D1, D2 or D4), so that each indicator is lightened to provide the same brightness. In the case where it is unnecessary to provide the same brightness for the indicators (LA), (LD) and (LC), the diode (D1), (D2) and (D4) may be omitted. However, if it is necessary to determine the operating condition through the indicators (LA), (LD) and (LC) at once, it is preferable to form the circuit as shown in FIG. 1. In lieu of the diodes (D1), (D2) and (D4), resistors may be used. In this case, however, since the brightness of the indicators connected to those resistors will be different from that of the indicator (LA) connected to the diode (D3) when the voltage of battery is decreased due to change in temperature, it is preferable to provide the same diode as the diode (D3). If a resistor is disposed between a position "b" and the diode (D1) in lieu of the resistors (R1) and (R2), it is possible to reduce the number of resistors by one. In this case, however, when the DEF mode switch (5) is turned on, so that the FACE mode switch (1) and so on are turned off, then the brightness of the indicator (LF) or (LR) of the F/R mode switch (7) is increased comparing with that in its normal condition, and therefore, the circuit as shown in FIG. 1 is preferable. Consequently, according to the present embodiment, even if all of the mode switches are turned off, the third switching section remains on, so that the defroster can be activated to remove the fog from the windshield.

Figure 2:
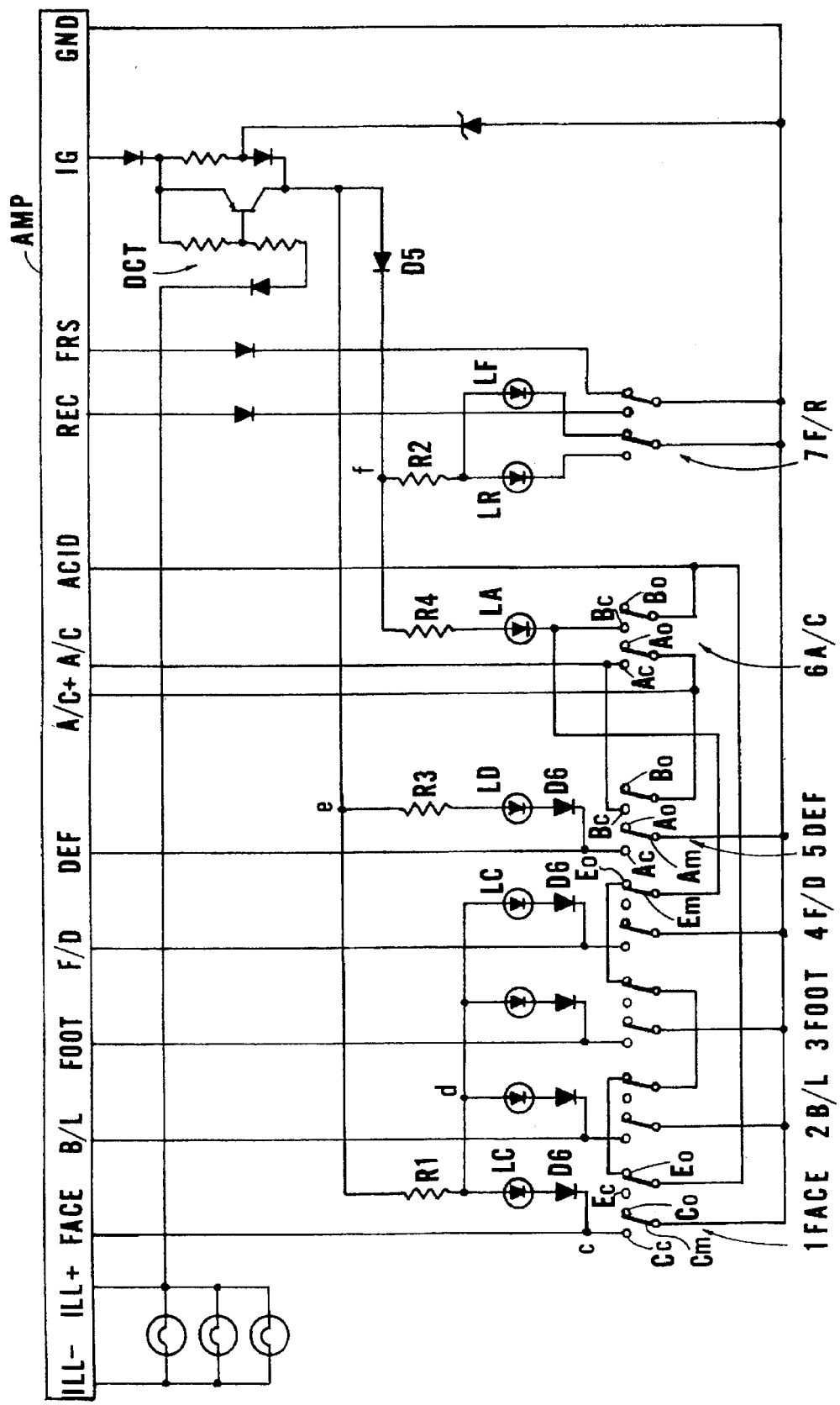
FIG. 2 is a schematic diagram of a control circuit according to a second embodiment of the present invention.

FIG. 2 illustrates a second embodiment of the present invention, which differs from the first embodiment in that the terminal (DEF) is connected to the fixed contact (Ac) of the DEF mode switch (5) together with the indicator (LD), and that the indicator (LA) is connected to the fixed contact (Eo) of the F/D mode switch (4), which is connected to the terminal (ACID) through each fixed contact (Eo) of the second switching section of the FOOT mode switch (3), B/L mode switch (2) and FACE mode switch (1). In order to protect the indicators (LC) and (LD) in this circuit, diodes (D6) are connected to their cathodes, respectively. For example, when the B/L mode switch (2) is turned on with the FACE mode switch (1) remaining off, the potential at a position "c" is about 12 volts (v), i.e., almost equal to the battery voltage, while the potential at a position "d" is about 3 V which is a voltage drop of the diode (D7) and the indicator (LC) connected in series thereto. In this circuit, if the diode (D6) was omitted, a reverse voltage of 9 V would be applied to the indicator (LC) connected to the FACE mode switch (1). However, in general, the reverse voltage admissible to a LED used for the indicator (LC) is as low as 4 V, so that the LED might be destroyed, if the reverse voltage was applied. According to the present embodiment, therefore, the normal diode (D6) having the admissible reverse voltage of about 80 V is connected in series to the LED. If a LED with a sufficient admissible reverse voltage was used, the diode (D6) could be omitted.

In the second embodiment, the diode (D5) is provided such that the brightness of the indicators (LA), (LR), (LF) shall be equal to that of other indicators (LD), (LC). If the resistors (R1) and (R3) are omitted and a resistor is provided at the upstream of the position "e", one resistor may be omitted. However, it is preferable to provide the resistor (R3) for adjusting the brightness of an indicator (LD) for indication of the defroster mode to be the same as the brightness of other indicators, in the case where a color of the indicator (LD) is set to be different from the color of other indicators (e.g., the former is orange, while the latter is green). Likewise, if the resistors R2 and R3 are omitted and a resistor is disposed at the upstream of the position "f", one resistor may be omitted. However, the number of light emitting diodes out of three light emitting diodes of the indicators (LR), (LF) and (LA) will be one or two (i.e., not constant). In order to keep the brightness constant, therefore, it is preferable to form the circuit as shown in FIG. 2.

Figure 3:
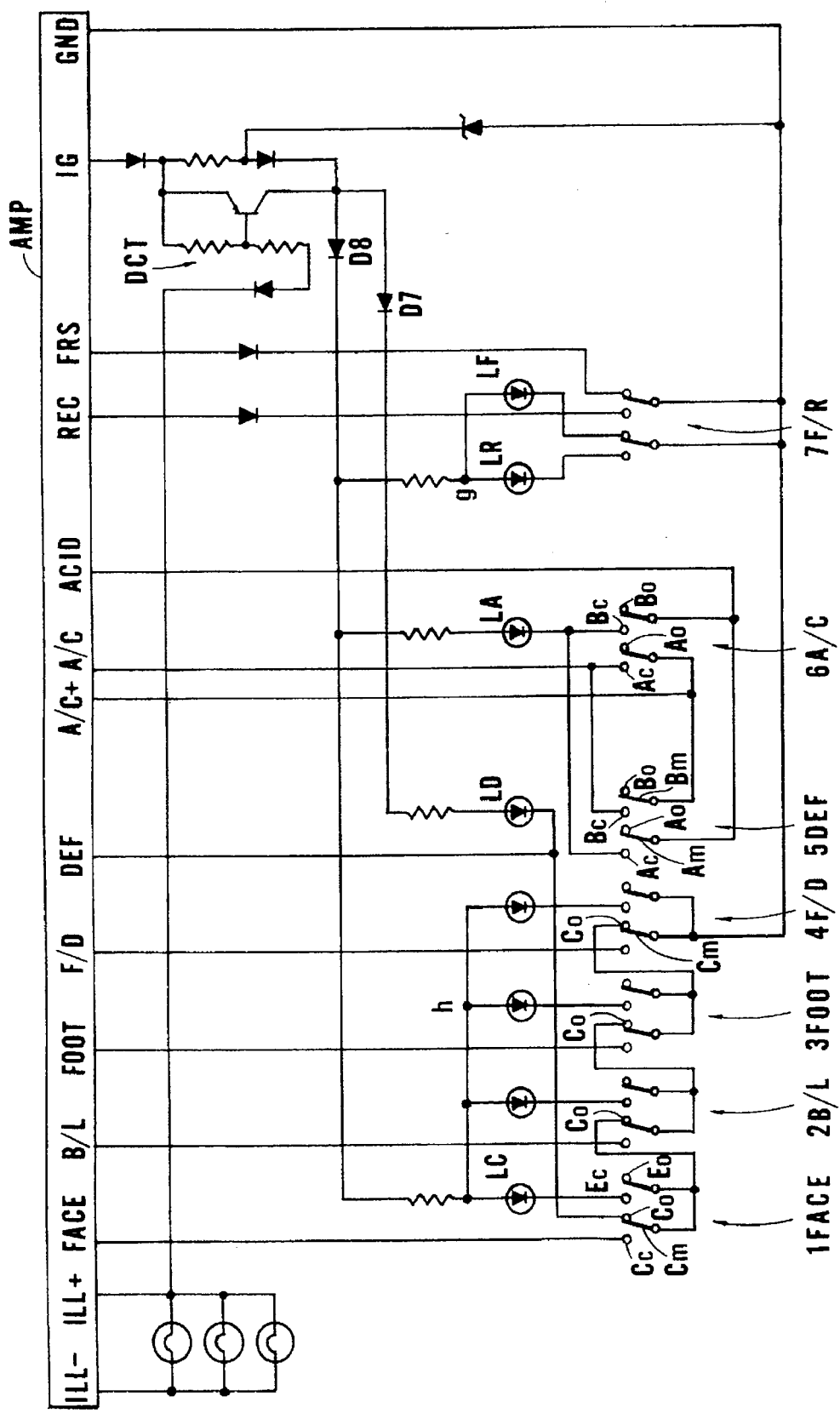
FIG. 3 is a schematic diagram of a control circuit according to a third embodiment of the present invention.

Referring to FIG. 3, there is illustrated a third embodiment, which differs from the first embodiment in that the indicator (LD) for indication of the defroster mode is connected to the fixed contact (Co) of the FACE mode switch (1) together with the terminal (DEF), and that the connection of the indicator (LA) for indication of the air conditioning mode is made in a reverse manner to the connection as shown in FIG. 1. A diode (D7) as shown in FIG. 3 has the same function as the diode (D6) as shown in FIG. 2, while a diode (DS) in FIG. 3 has the same function as the diode (D5) in FIG. 2. If a position "g" is connected to a position "h" in FIG. 3, a resistor may be omitted. In this case, however, when the DEF mode switch (5) is turned on, and all of the FACE mode switch (1) and so on are turned off, the indicator (LF) or (LR) will be brighter than in the normal case. Therefore, the present circuit in FIG. 3 is preferable.

Figure 4:
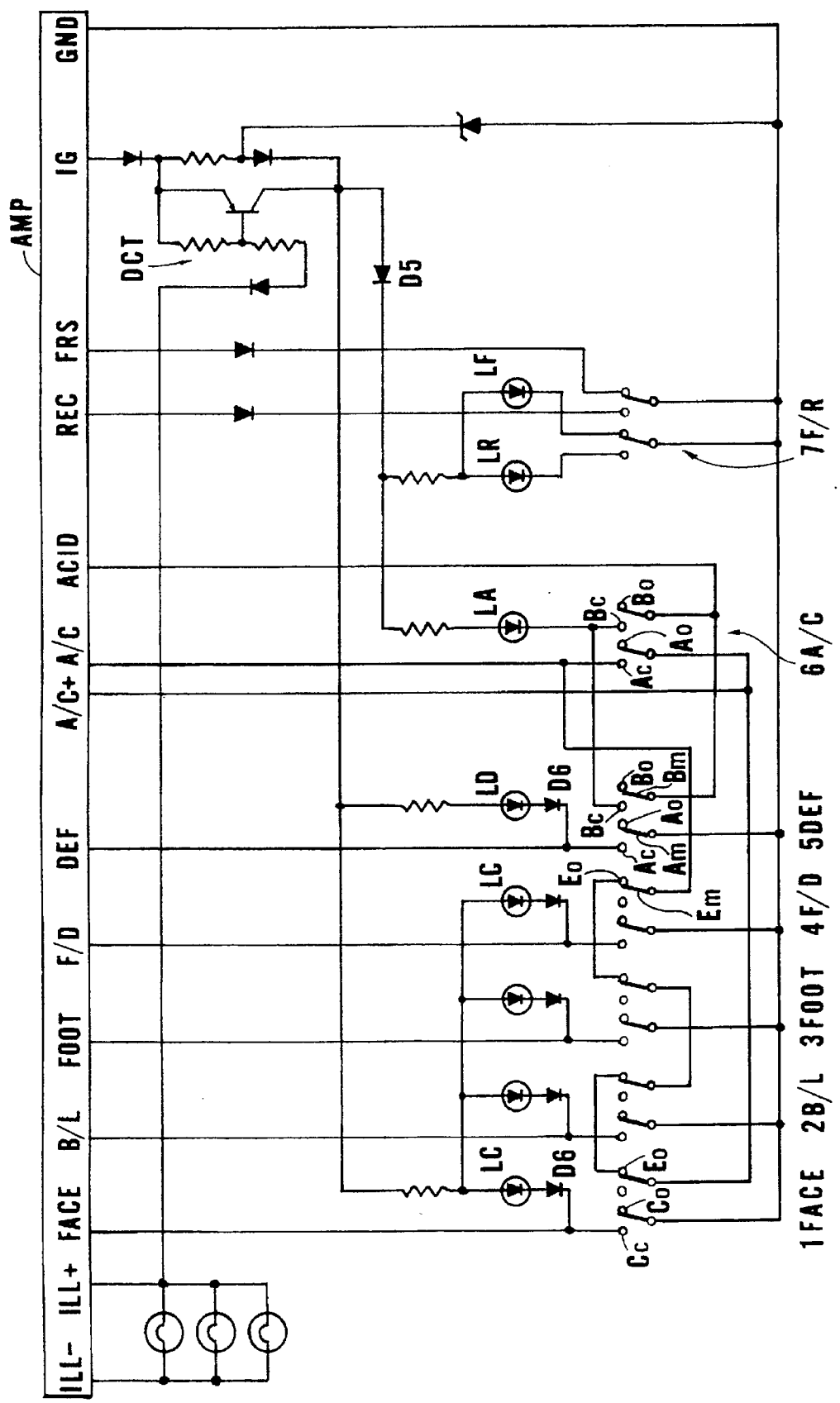
FIG. 4 is a schematic diagram of a control circuit according to a fourth embodiment of the present invention.

FIG. 4 illustrates a fourth embodiment, which differs from the second embodiment (as shown in FIG. 2) in that the contacts for connecting or disconnecting between the terminals (A/C+) and (A/C), and the contacts for connecting or disconnecting the circuit including the indicator (LA) are arranged reversely. That is, in FIG. 4, the indicator (LA) is connected to the terminal (ACID) through the fixed contact (Bc) of the DEF mode switch (5), the terminal (A/C+) is connected to the terminal (A/C) through each fixed contact (Eo) of the FACE mode switch (1) and so on. The diodes (D5), (D6) as shown in FIG. 4 function in the same manner as the diodes (D5), (D6) as shown in FIG. 2.

Figure 5:
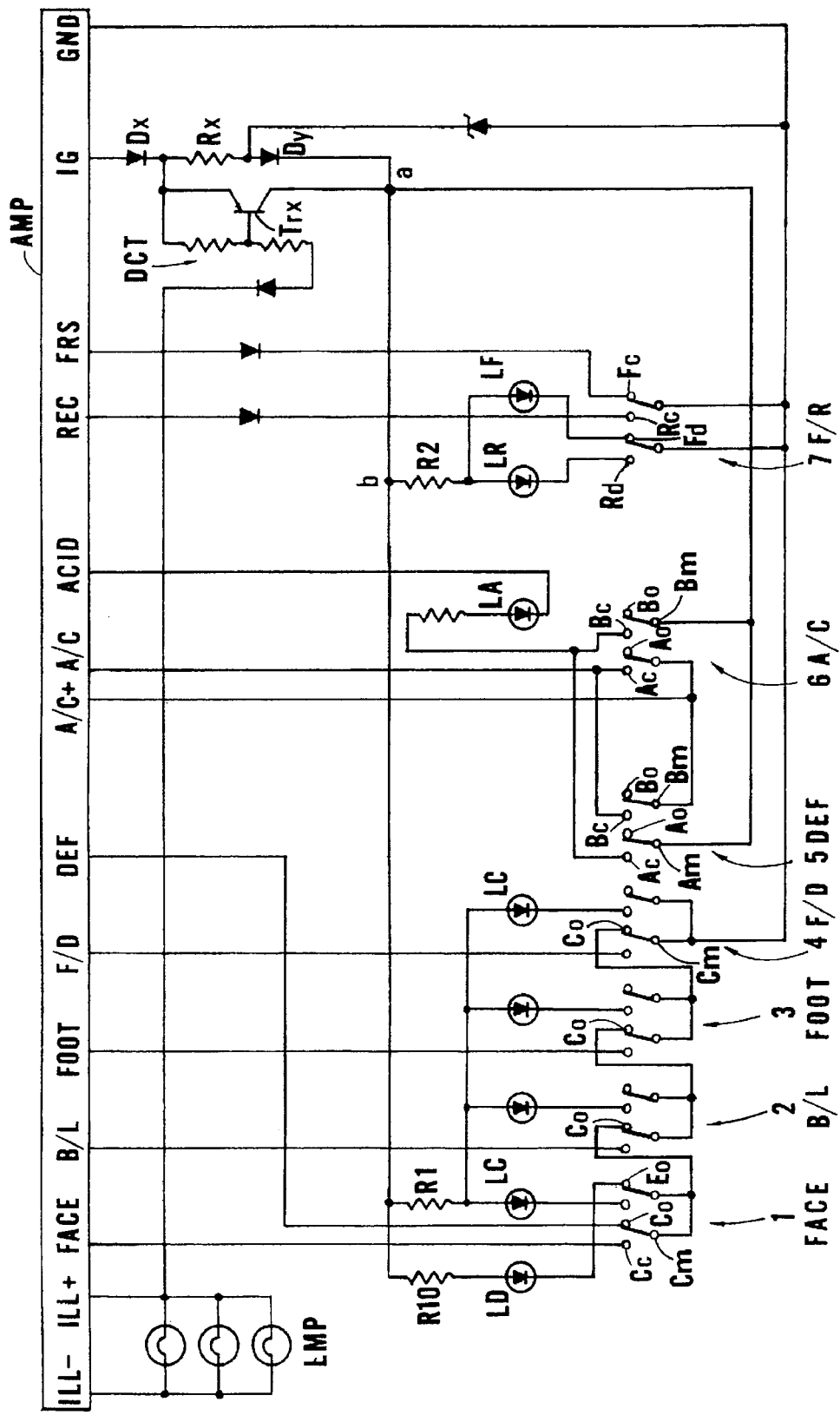
FIG. 5 is a schematic diagram of a control circuit according to a fifth embodiment of the present invention.
Figure 6:
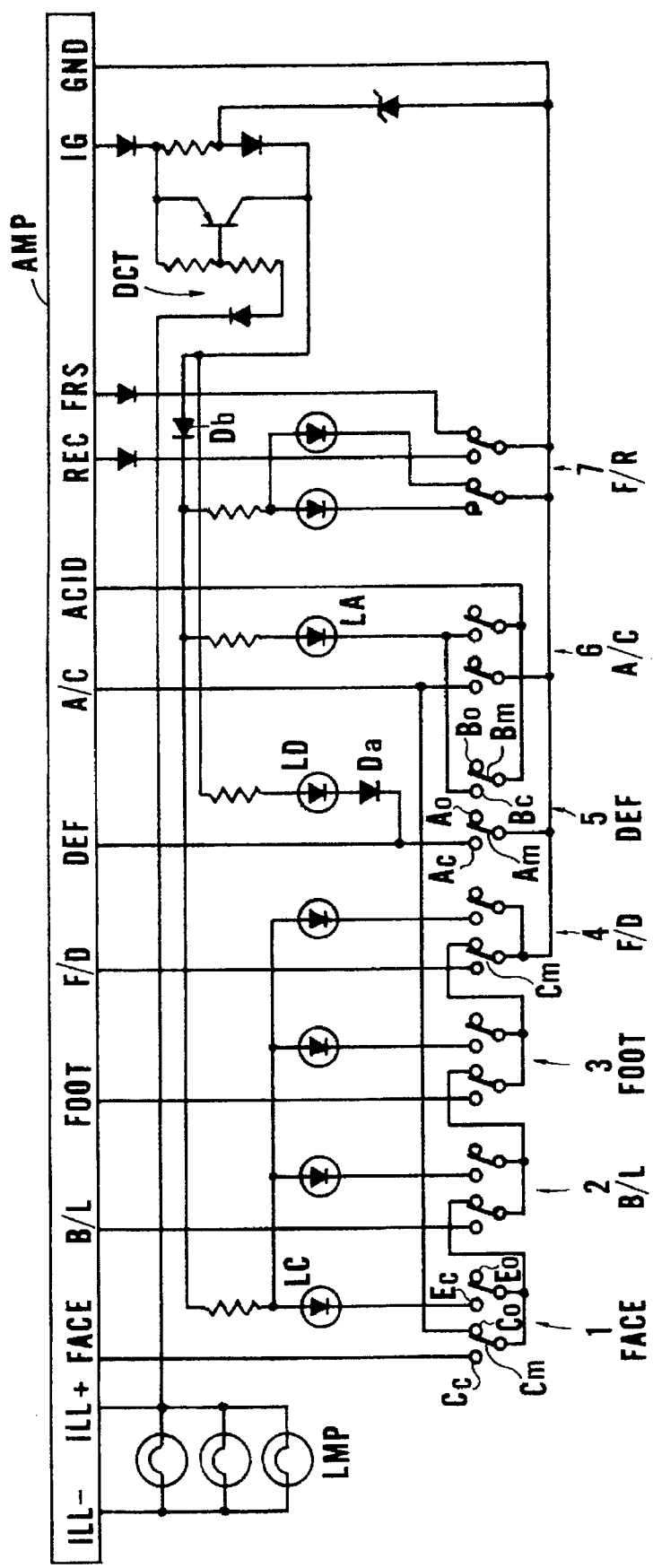
FIG. 6 is a schematic diagram of a control circuit according to a sixth embodiment of the present invention.
Figure 7:
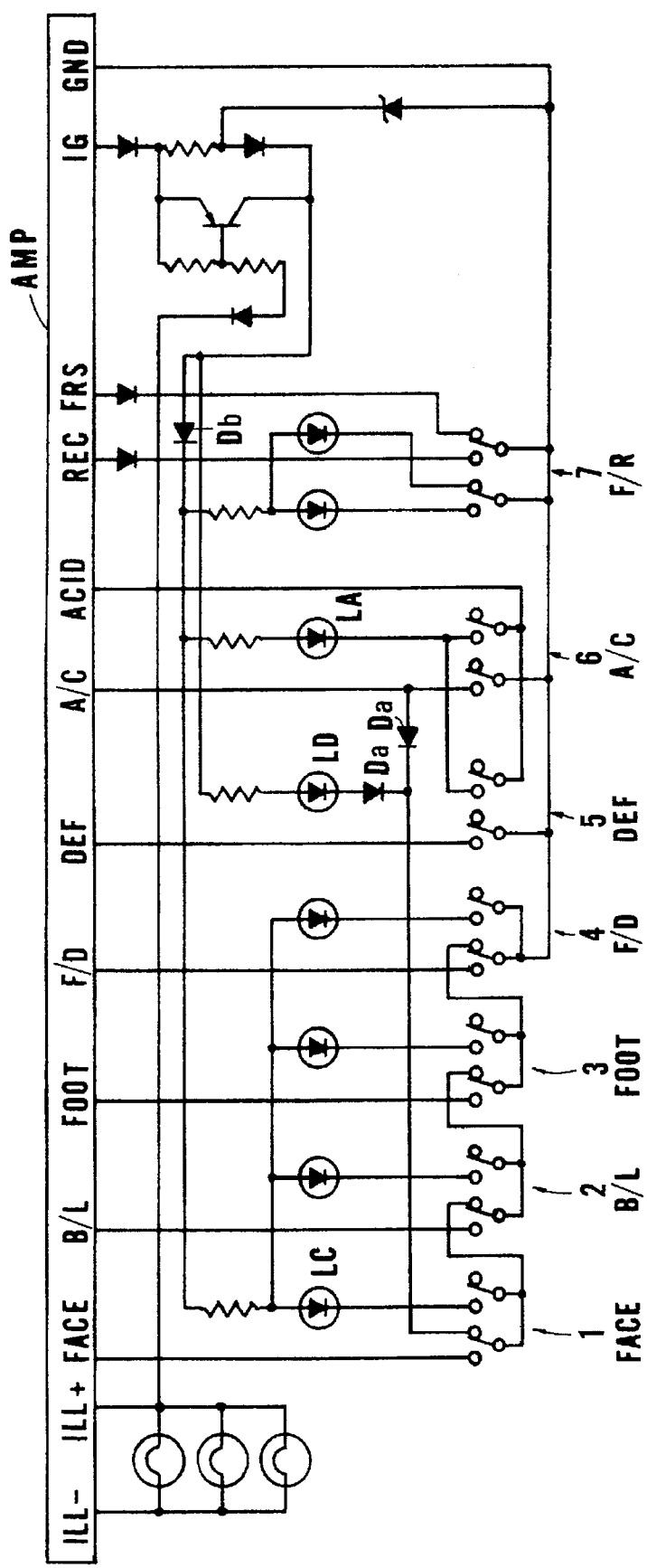
FIG. 7 is a schematic diagram of a control circuit according to a seventh embodiment of the present invention.

FIG. 5 illustrates a fifth embodiment, which differs from the first embodiment (as shown in FIG. 1) in that the indicator (LD) for indication of the defroster mode is connected to the fixed contact (Eo) of the FACE mode switch (1), and a resistor (R10) is connected at the upstream of the indicator (LD). As a result, the diode (D3) as shown in FIG. 1 provided for blocking a reverse flow of current can be omitted. Also, both of the diode (D4) which is provided for keeping the brightness of the indicator (LA) for indication of the air conditioning mode to be constant, and the diode (D2) which is provided for keeping the brightness of the indicators (LD) and (LC) to be equal to each other, may be omitted to reduce in cost. If the color of the indicator (LD) is set to be the same as that of the indicator (LC), the anode of the indicator (LD) may be connected to the anode of the indicator (LC), thereby to omit the resistor (R10). The cathode of the indicator (LD) may be connected to the fixed contact (Co) of the FACE mode switch (1), without being connected to the fixed contact (Eo). In this case, however, a diode (not shown) for blocking a reverse flow of current has to be provided between the cathode of the indicator (LD) and the fixed contact (Co).

With respect to the above-described first to fifth embodiments, the fixed contacts (Ac), (Bc) of the DEF mode switch (5) and the fixed contacts (Co) or (Eo) (represents a plurality of contacts (Co) or (Eo) which are connected in series) of other mode switches are arranged to connect the terminals of the amplifier as shown in FIG. 15. With the first switching section including the fixed contact (Ac), the second switching section including the fixed contact (Bc) and the third switching section including the fixed contacts (Co) or (Eo) operated properly, the circuit for activating the defroster can be driven by connecting the terminal (DEF) to the terminal (GND), the circuit for activating the compressor can be driven by connecting the terminal (A/C+) to the terminal (A/C), the indicator (LD) for indication of the defroster mode can be lightened by connecting the terminal (IG) to the terminal (GND), and the indicator (LA) for indication of the air conditioning mode can be lightened by connecting the terminal (IG) to the terminal (ACID). The terminal (IG) is connected to the indicators (LA), (LD) through the light control circuit (DCT). In FIG. 15, "LA" and "LD" represent the indicators (LA), (LD), respectively, and "EMB." indicates the embodiment. According to the first to fifth embodiments, therefore, the connection between the terminal (DEF) and terminal (GND), and the connection between the terminal (A/C+) and terminal (A/C) are connected or disconnected, respectively, by a pair of switches out of three switches which include the fixed contacts (Ac), (Bc) and (Co) (or (Eo)), the rest of which is provided for connecting or disconnecting the circuit for actuating the indicator (LD). The circuit for actuating the indicator (LA) is connected or disconnected by one of the fixed contacts (Ac), (Bc) and (Co) (or (Eo)).

FIGS. 6–12 illustrate embodiments which are arranged to activate the compressor (not shown), when the terminal (A/C) is connected to the terminal (GND) to be grounded, without the terminal (A/C+) used in the embodiments as shown in FIGS. 1–5. Based on the combination of connections between the terminals of the amplifier through the fixed contacts (Ac), (Bc) and (Co) (or (Eo)), the sixth to twelfth embodiments have been formed as shown in FIGS. 6–12. The construction of each switch as shown in FIGS. 6–12 is the same as that in FIGS. 1–5, so that reference numerals are omitted in FIGS. 6–12. The indicators (LA), (LD) may be connected to the terminal (GND), in stead of the terminal (ACID). With respect to the sixth to twelfth embodiments, the fixed contacts (Ac), (Bc) of the DEF mode switch (5) and the fixed contacts (Co) or (Eo) (represents a plurality of contacts (Co) or (Eo) which are connected in series) of other mode switches are arranged to connect the terminals of the amplifier as shown in FIG. 16. With the first switching section including the fixed contact (Ac), the second switching section including the fixed contact (Bc) and the third switching section including the fixed contacts (Co) or (Eo) operated properly, the circuit for activating the defroster can be driven by connecting the terminal (DEF) to the terminal (GND), the circuit for activating the compressor can be driven by connecting the terminal (A/C) to the terminal (GND), the indicator (LD) for indication of the defroster mode can be lightened by connecting the terminal (IG) to the terminal (GND), and the indicator (LA) for indication of the air conditioning mode can be lightened by connecting the terminal (IG) to the terminal (ACID).

Figure 8:
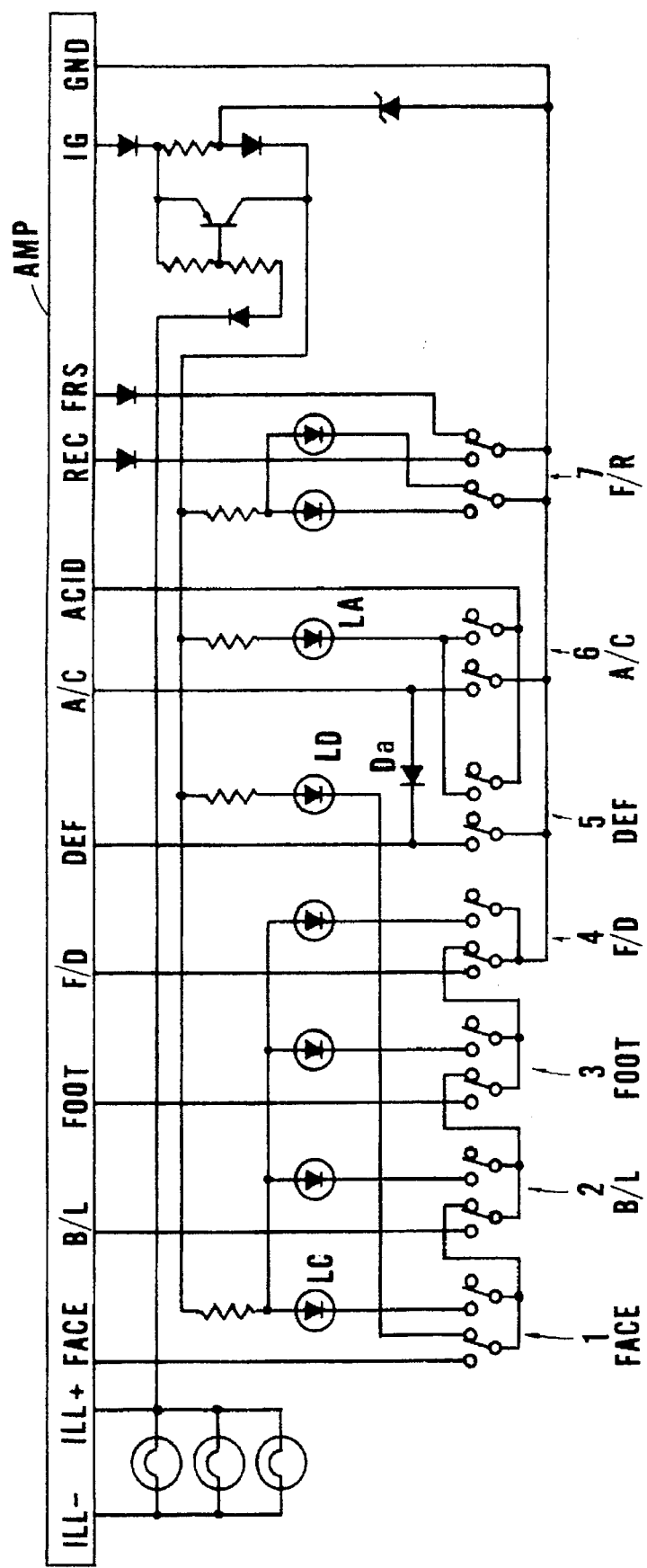
FIG. 8 is a schematic diagram of a control circuit according to an eighth embodiment of the present invention.
Figure 9:
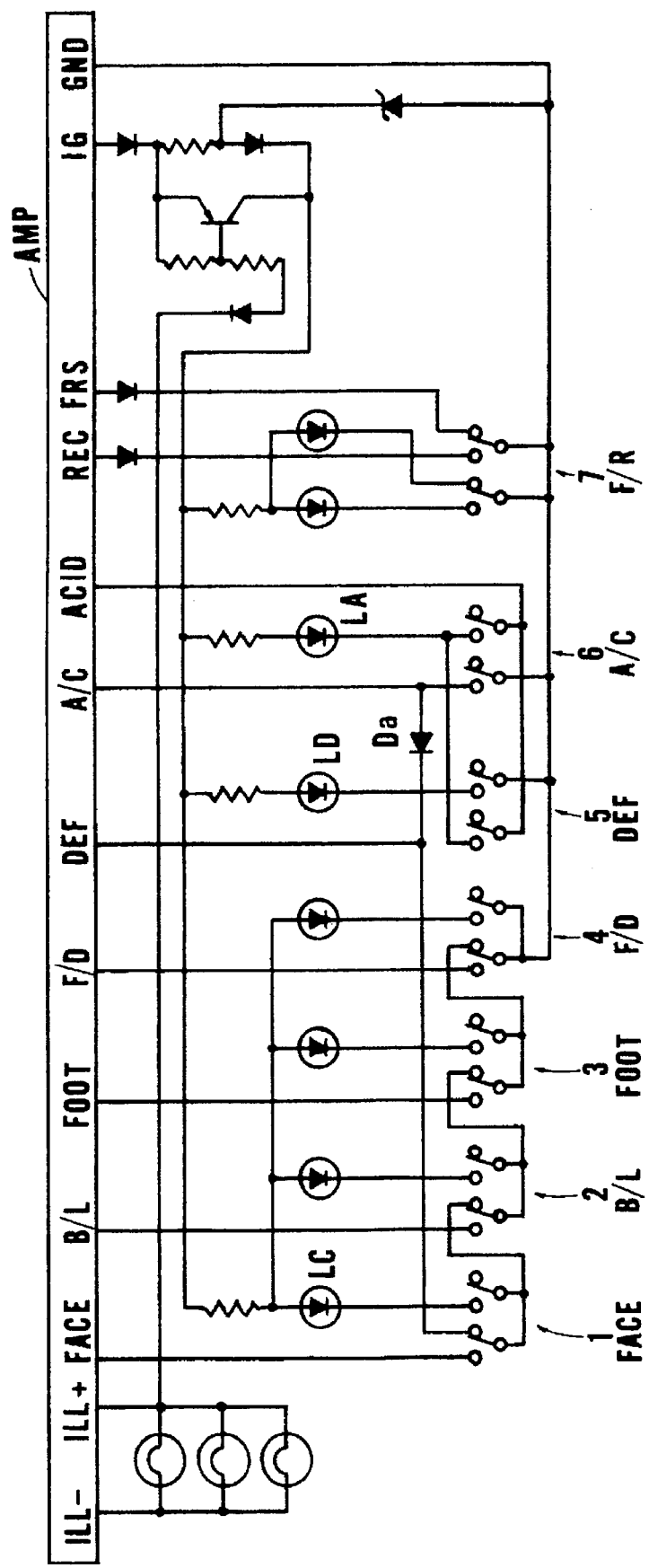
FIG. 9 is a schematic diagram of a control circuit according to a ninth embodiment of the present invention.
Figure 10:
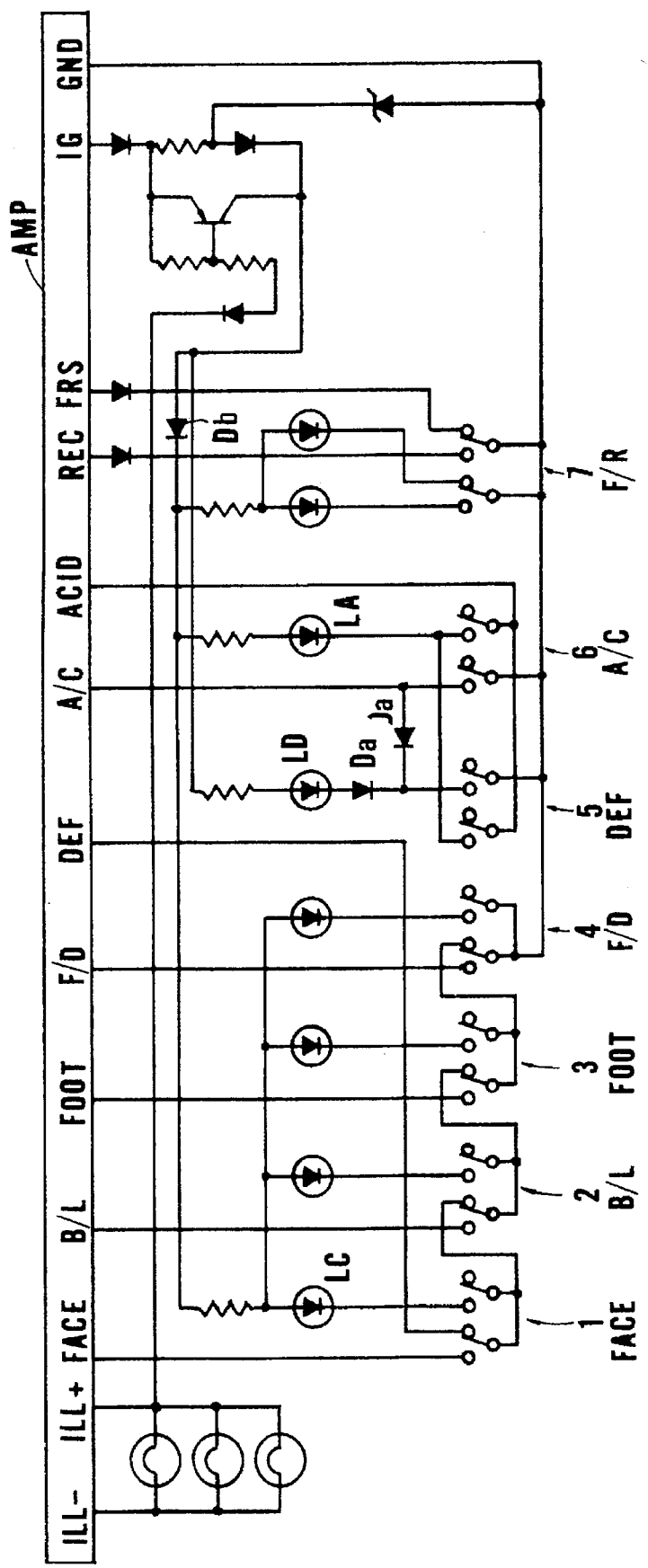
FIG. 10 is a schematic diagram of a control circuit according to a tenth embodiment of the present invention.
Figure 11:
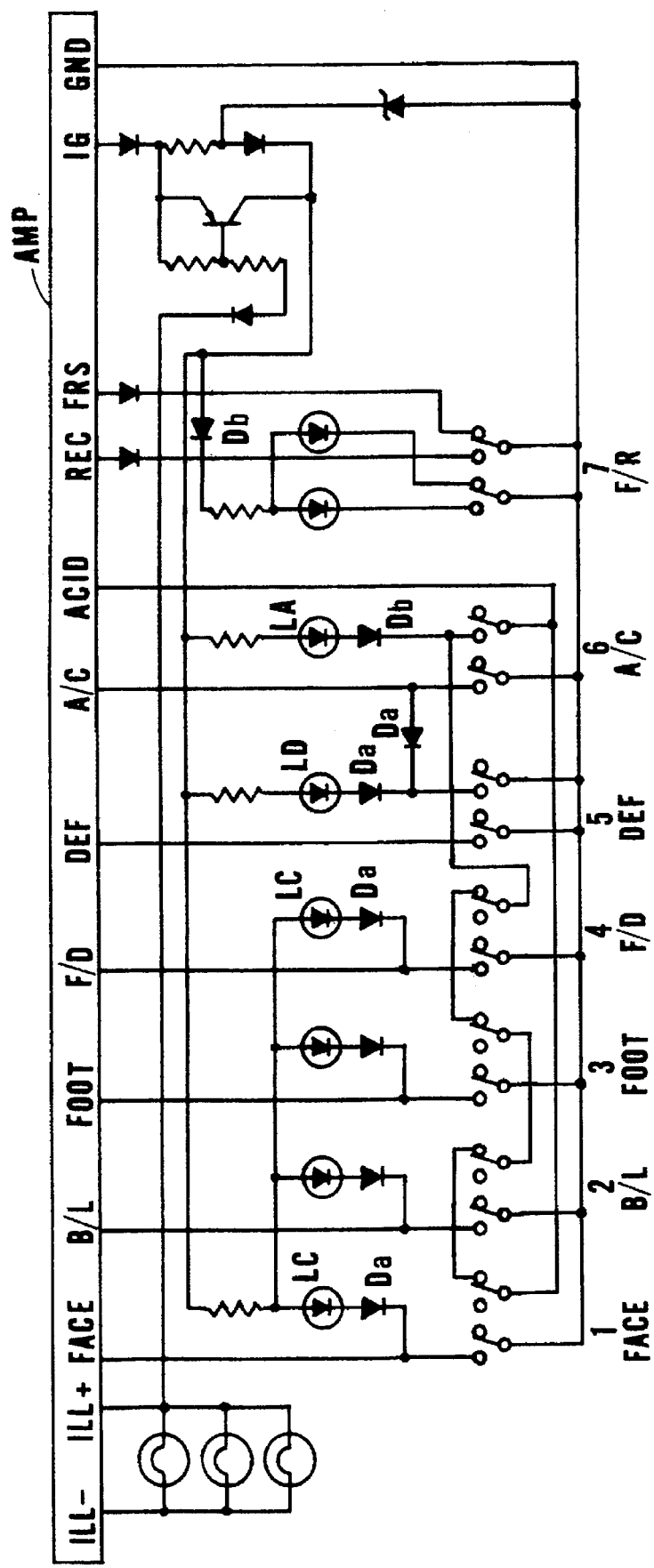
FIG. 11 is a schematic diagram of a control circuit according to an eleventh embodiment of the present invention.
Figure 12:
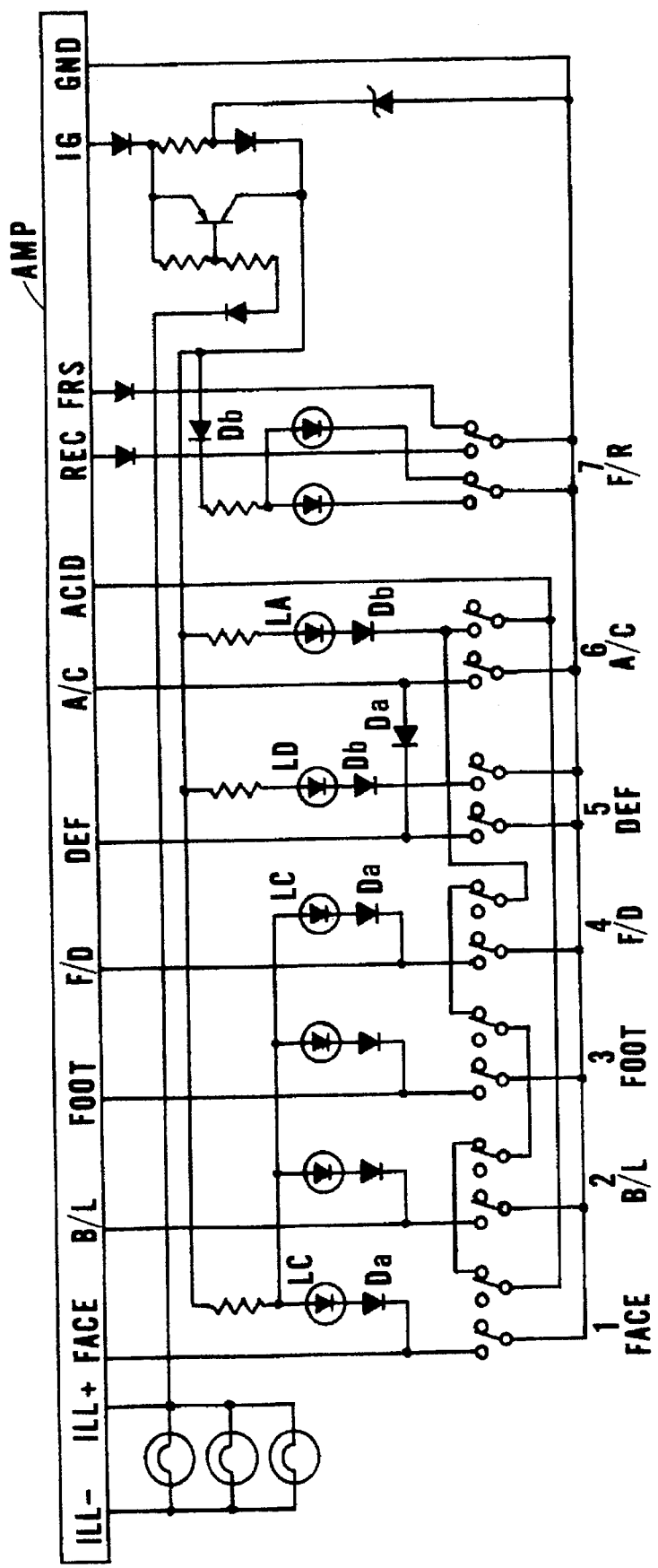
FIG. 12 is a schematic diagram of a control circuit according to a twelfth embodiment of the present invention.

In the sixth to tenth embodiments, a diode (Da) is a diode for preventing a reverse flow of current, such as the diode (D6) in the previous embodiments, while a diode (Db) is a diode for controlling the brightness of the indicator, such as the diodes (D1), (D2), (D4) in the previous embodiments. Some of the diodes or resistors may be deleted in the same manner as done in the previous embodiments. According to the sixth, seventh, tenth and eleventh embodiments as shown in FIGS. 6, 7, 10 and 11, respectively, the connection between the terminal (DEF) and terminal (GND), and the connection between the terminal (A/C) and terminal (GND) are connected or disconnected, respectively, by a pair of switches out of three switches which include the fixed contacts (Ac), (Bc) and (Co) (or (Eo)), the rest of which is provided for connecting or disconnecting the circuit for actuating the indicator (LD). The circuit for actuating the indicator (LA) is connected or disconnected by one of the fixed contacts (Ac), (Bc) and (Co) (or (Eo)). According to the eighth, ninth and twelfth embodiments as shown in FIGS. 8, 9 and 12 respectively, the circuit for actuating the indicator (LD) and the circuit for actuating the indicator (LA) are connected or disconnected, respectively, by a pair of switches out of the first to third switching sections which include the fixed contacts (Ac), (Bc) and (Co) (or (Eo)), and the rest of which is provided for connecting or disconnecting between the terminals (DEF), (A/C) and the terminal (GND), simultaneously. The sixth to twelfth embodiments may include such features that the terminal (A/C) in the first to fifth embodiments as shown in FIGS. 1-5 is grounded, and that the terminal (A/C) is substituted for the terminal (A/C+) in the first to fifth embodiments.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A control circuit for a vehicle air conditioning system having a compressor for dehumidifying air and a plurality of vents disposed in said vehicle for controlling the air dehumidified by said compressor and introduced into a compartment of said vehicle, comprising:

a compressor circuit for activating said compressor;

a defroster circuit for shifting an air outlet to a vent for removing fog from windows of said vehicle;

a first indicator circuit for indicating a condition of said compressor being activated;

a second indicator circuit for indicating a defroster mode;

a plurality of mode switches for shifting said vents in accordance with a plurality of control modes including said defroster mode, each of said mode switches having first switching means and second switching means actuated together in response to operation of each of said mode switches, said mode switches being arranged such that when one of said mode switches is turned on, the rest of said mode switches are turned off; and third switching means including contacts provided at each "off" side of one of said first switching means and second switching means provided in the rest of said mode switches, said contacts being connected in series;

said first, second and third switching means being provided for connecting or disconnecting said defroster circuit, compressor circuit, first indicator circuit and second indicator circuit.

2. The control circuit as defined in claim 1, wherein two of said first, second and third switching means are provided for connecting or disconnecting said defroster circuit and connecting or disconnecting said compressor circuit, respectively, and the remaining one of said first, second and third switching means is provided for connecting or disconnecting said first indicator circuit, and wherein one of said first, second, third switching means is provided for connecting or disconnecting said second indicator circuit.

3. The control circuit as defined in claim 2, wherein said first switching means is provided for connecting or disconnecting said first indicator circuit and said second indicator circuit, and said second switching means is provided for connecting or disconnecting said compressor circuit, and wherein said third switching means is provided for connecting or disconnecting said defroster circuit.

4. The control circuit as defined in claim 2, wherein said first switching means is provided for connecting or disconnecting said defroster circuit and said second indicator circuit, and said second switching means is provided for connecting or disconnecting said compressor circuit, and wherein said third switching means is provided for connecting or disconnecting said first indicator circuit.

5. The control circuit as defined in claim 2, wherein said first switching means is provided for connecting or disconnecting said first indicator circuit, and said second switching means is provided for connecting or disconnecting said compressor circuit, and wherein said third switching means is provided for connecting or disconnecting said defroster circuit and said second indicator circuit.

6. The control circuit as defined in claim 2, wherein said first switching means is provided for connecting or disconnecting said defroster circuit and said second indicator circuit, and said second switching means is provided for connecting or disconnecting said first indicator circuit, and wherein said third switching means is provided for connecting or disconnecting said compressor circuit.

7. The control circuit as defined in claim 2, wherein said first switching means is provided for connecting or disconnecting said defroster circuit, and said second switching means is provided for connecting or disconnecting said first indicator circuit, and wherein said third switching means is provided for connecting or disconnecting said compressor circuit and said second indicator circuit.

8. The control circuit as defined in claim 2, wherein said first switching means is provided for connecting or disconnecting said first indicator circuit, and said second switching means is provided for connecting or disconnecting said second indicator circuit and said compressor circuit, and wherein said third switching means is provided for connecting or disconnecting said defroster circuit.

9. The control circuit as defined in claim 2, wherein said first switching means is provided for connecting or disconnecting said defroster circuit, and said second switching means is provided for connecting or disconnecting said compressor circuit and said second indicator circuit, and wherein said third switching means is provided for connecting or disconnecting said first indicator circuit.

10. The control circuit as defined in claim 1, wherein two of said first, second and third switching means are provided for connecting or disconnecting said first indicator circuit and connecting or disconnecting said second indicator circuit, respectively, and the remaining one of said first, second and third switching means is provided for connecting or disconnecting said defroster circuit and said compressor circuit.

11. The control circuit as defined in claim 10, wherein said first switching means is provided for connecting or disconnecting said defroster circuit and said compressor circuit, and said second switching means is provided for connecting or disconnecting said first indicator circuit, and wherein said third switching means is provided for connecting or disconnecting said second indicator circuit.

12. The control circuit as defined in claim 10, wherein said first switching means is provided for connecting or disconnecting said first indicator circuit, and said second switching means is provided for connecting or disconnecting said second indicator circuit, and wherein said third switching means is provided for connecting or disconnecting said defroster circuit and said compressor circuit.

13. The control circuit as defined in claim 10, wherein said first switching means is provided for connecting or disconnecting said defroster circuit and said compressor circuit, and said second switching means is provided for connecting or disconnecting said second indicator circuit, and wherein said third switching means is provided for connecting or disconnecting said first indicator circuit.

14. The control circuit as defined in claim 1, wherein said first switching means and second switching means include a pair of fixed contacts and a moving contact normally positioned to contact with one of said fixed contacts, respectively, and wherein said third switching means includes fixed contacts which are normally positioned at each "off" side of said switching means in the rest of said mode switches, and which are connected in series.

15. The control circuit as defined in claim 14, wherein said first indicator and second indicator include a light emitting diode connected to one of said fixed contacts, respectively.

* * * * *